United States Patent
Suzuki

(10) Patent No.: US 7,854,383 B2
(45) Date of Patent: Dec. 21, 2010

(54) IMAGE FORMING APPARATUS, AND IMAGE FORMING METHOD

(75) Inventor: Katsunori Suzuki, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 972 days.

(21) Appl. No.: 11/677,769

(22) Filed: Feb. 22, 2007

(65) Prior Publication Data

US 2008/0203168 A1 Aug. 28, 2008

(51) Int. Cl.
G06K 7/10 (2006.01)
G06K 7/00 (2006.01)
G06K 19/00 (2006.01)
G06K 5/00 (2006.01)
G06K 1/00 (2006.01)
G06K 15/00 (2006.01)
G06F 3/12 (2006.01)
G06F 15/00 (2006.01)
H04N 1/40 (2006.01)

(52) U.S. Cl. ......... 235/462.01; 235/435; 235/487; 235/382; 358/1.1; 358/1.13; 358/1.14; 358/1.15; 358/1.18; 358/3.28

(58) Field of Classification Search ......... 358/3.28, 358/1.13, 1.14, 1.15, 1.18, 1.1; 235/462.01, 235/435, 487, 382
See application file for complete search history.

(56) References Cited

U.S. PATENT DOCUMENTS

| | | | | |
|---|---|---|---|---|
| 5,444,779 A * | 8/1995 | Daniele | ......... | 399/366 |
| 5,974,202 A * | 10/1999 | Wang et al. | ......... | 382/306 |
| 6,226,105 B1 * | 5/2001 | Fukushi | ......... | 358/452 |
| 6,256,105 B1 * | 7/2001 | Nobuaki et al. | ......... | 358/1.15 |
| 6,873,435 B1 * | 3/2005 | Tehranchi et al. | ......... | 358/1.9 |
| 7,075,676 B2 * | 7/2006 | Owen | ......... | 358/1.18 |
| 7,256,903 B2 * | 8/2007 | Ando | ......... | 358/1.14 |
| 7,567,355 B2 * | 7/2009 | Matsunoshita | ......... | 358/1.13 |
| 7,588,192 B2 * | 9/2009 | Bystrom et al. | ......... | 235/494 |
| 2001/0052993 A1 * | 12/2001 | Lumley | ......... | 358/1.12 |
| 2002/0075507 A1 * | 6/2002 | Owen | ......... | 358/1.15 |
| 2003/0169443 A1 * | 9/2003 | Ando | ......... | 358/1.14 |
| 2003/0179412 A1 * | 9/2003 | Matsunoshita | ......... | 358/3.28 |
| 2004/0046987 A1 * | 3/2004 | Mima | ......... | 358/1.14 |
| 2005/0007614 A1 * | 1/2005 | Kishigami | ......... | 358/1.13 |
| 2005/0094178 A1 * | 5/2005 | Anno | ......... | 358/1.13 |
| 2006/0007471 A1 * | 1/2006 | Okamoto et al. | ......... | 358/1.14 |
| 2006/0209351 A1 * | 9/2006 | Saito | ......... | 358/3.28 |
| 2007/0052980 A1 * | 3/2007 | Lee | ......... | 358/1.1 |
| 2007/0053732 A1 * | 3/2007 | Hikosaka | ......... | 399/366 |
| 2007/0170250 A1 * | 7/2007 | Bystrom et al. | ......... | 235/382 |
| 2007/0291318 A1 * | 12/2007 | Wang et al. | ......... | 358/3.28 |
| 2008/0018942 A1 * | 1/2008 | Komiya | ......... | 358/3.28 |
| 2008/0028221 A1 * | 1/2008 | Endo et al. | ......... | 713/176 |

(Continued)

FOREIGN PATENT DOCUMENTS

JP 2000-255909 9/2000

(Continued)

*Primary Examiner*—Daniel Walsh
(74) *Attorney, Agent, or Firm*—Turocy & Watson, LLP

(57) ABSTRACT

An image forming apparatus has a generating unit that generates an identifier image according to a print command received from an outside and an image forming unit that forms, on a recording medium, an image based on the print command and the identifier image generated.

18 Claims, 15 Drawing Sheets

U.S. PATENT DOCUMENTS

| | | | |
|---|---|---|---|
| 2008/0239346 A1* | 10/2008 | Fujii et al. | 358/1.9 |
| 2009/0021758 A1* | 1/2009 | Miyazaki et al. | 358/1.13 |
| 2009/0190183 A1* | 7/2009 | Hosoda | 358/3.28 |
| 2009/0262390 A1* | 10/2009 | Tanaka | 358/1.15 |

FOREIGN PATENT DOCUMENTS

| | | | |
|---|---|---|---|
| JP | 2005-107057 | | 4/2005 |
| JP | 2005229176 A | * | 8/2005 |

* cited by examiner

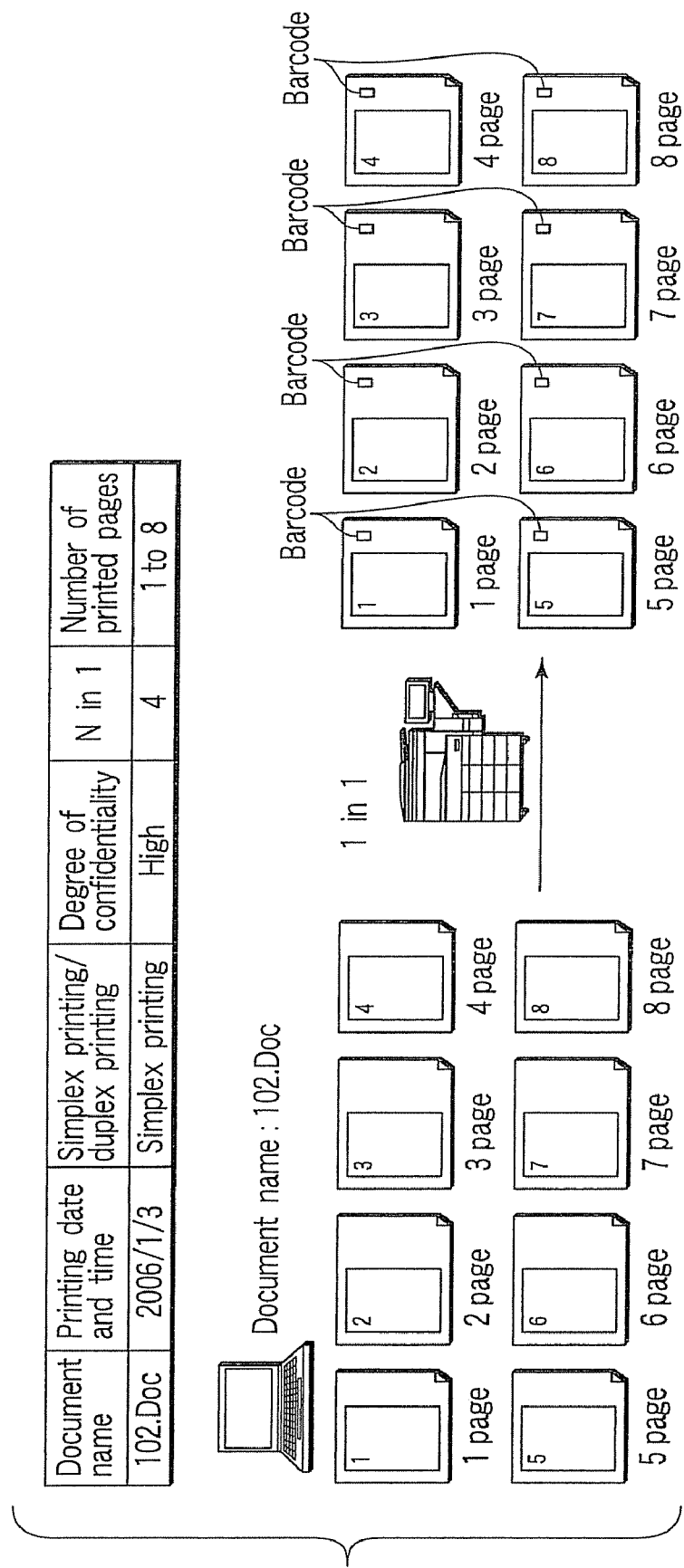
F I G. 6

| Barcode | Document name | Printing date and time | Simplex printing/ duplex printing | Degree of confidentiality | Sheet number | N in 1 | Number of printed pages | Function | Copy source |
|---|---|---|---|---|---|---|---|---|---|
| 101 | 102.doc | 2006/1/3 | Simplex printing | High | 1 | 1 | 1 to 8 | Printing | – |
| 102 | 102.doc | 2006/1/3 | Simplex printing | High | 2 | 1 | 1 to 8 | Printing | – |
| 103 | 102.doc | 2006/1/3 | Simplex printing | High | 3 | 1 | 1 to 8 | Printing | – |
| 104 | 102.doc | 2006/1/3 | Simplex printing | High | 4 | 1 | 1 to 8 | Printing | – |
| 105 | 102.doc | 2006/1/3 | Simplex printing | High | 5 | 1 | 1 to 8 | Printing | – |
| 106 | 102.doc | 2006/1/3 | Simplex printing | High | 6 | 1 | 1 to 8 | Printing | – |
| 107 | 102.doc | 2006/1/3 | Simplex printing | High | 7 | 1 | 1 to 8 | Printing | – |
| 108 | 102.doc | 2006/1/3 | Simplex printing | High | 8 | 1 | 1 to 8 | Printing | – |
| 109 | 102.doc | 2006/1/3 | Simplex printing | High | 1 | 4 in 1 | 1 to 8 | Printing | – |
| 110 | 102.doc | 2006/1/3 | Simplex printing | High | 2 | 4 in 1 | 1 to 8 | Printing | – |
| 111 | – | 2006/1/3 | Simplex printing | High | 1 | 1 | 1 | Copying | 110 |
| 112 | – | 2006/1/3 | Simplex printing | High | 1 | 1 | 1 | Copying | – |
| 113 | – | 2006/1/3 | Simplex printing | High | 1 | 4 in 1 | 1 to 8 | Copying | 101, 102, 103, 104 |
| 114 | – | 2006/1/3 | Simplex printing | High | 1 | 4 in 1 | 1 to 8 | Copying | 105, 106, 107, 108 |
| 115 | – | 2006/1/3 | Simplex printing | High | 1 | 4 in 1 | 1 to 8 | Copying | |

F I G. 8

IMAGE FORMING APPARATUS, AND IMAGE FORMING METHOD

BACKGROUND OF THE INVENTION

Recently, according to the improvement of performance of image forming apparatuses such as a digital copying machine, an integrated digital apparatus having not only a copying function but also a function of a printer is developed and spread. As a secondary function of such image forming apparatuses, a technique for keeping security of sheets is known.

A Patent Document 1 (JP-A-2005-107057) discloses a technique for managing paper by adding, at the time of copying, a storing member that stores identification information separately from visible information to at least one of sheets at a copy source and a copy destination.

However, in this Patent Document 1, since the sheets are made physically bulky by the addition of the storing member, it is hard to handle the sheets. Further, because of a physical operation for adding the storing member at the time of mounting of the same, there is a problem in that, for example, a jam of paper or an error such as un-mounting of the storing unit may occur or the storing member once added may be lost.

BRIEF SUMMARY OF THE INVENTION

An embodiment of an image forming apparatus according to the invention is an image forming apparatus including: a generating unit (124) that generates an identifier image according to a print command received from the outside; and an image forming unit (6) that forms, on a recording medium, an image based on the print command and the identifier image generated.

BRIEF DESCRIPTION OF THE SEVERAL VIEWS OF THE DRAWING

FIG. 6 is an explanatory diagram showing an example of copy processing for copying to an image having a barcode based on a print command not having a barcode in the image forming apparatus according to the invention;

FIG. 8 is an explanatory diagram showing an example of contents of respective kinds of barcode information treated by the image forming apparatus according to the invention;

DETAILED DESCRIPTION OF THE INVENTION

Sorting processing for sorting discharged paper in an image forming apparatus according to an embodiment of the invention will be hereinafter explained in detail using the drawings.

<Image Forming Apparatus According to the Invention>
(Mechanical Structure)

Figure 1:
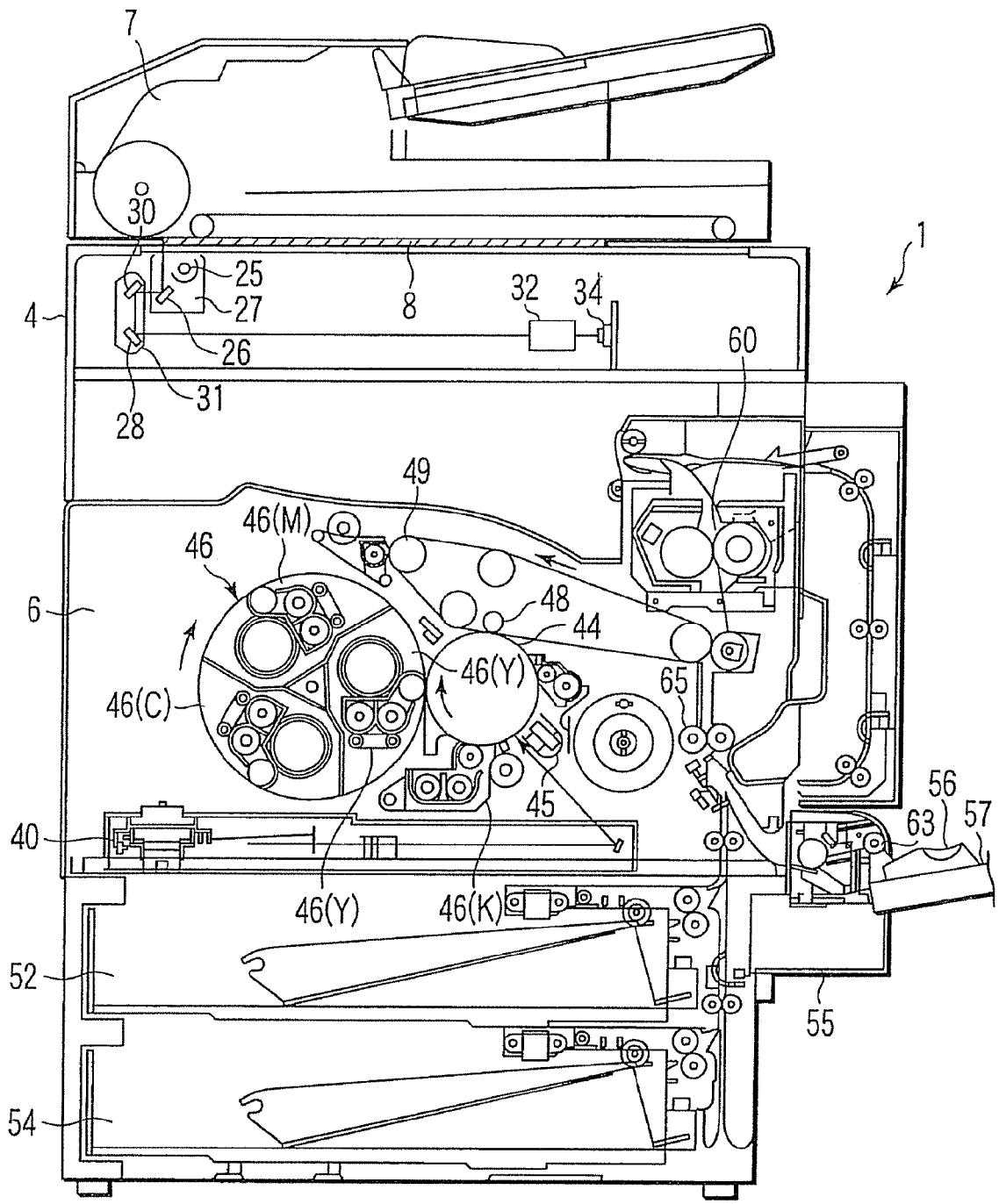
FIG. 1 is a diagram for explaining an example of a mechanical structure of an image forming apparatus according to the invention.

First, an example of a structure of an image forming apparatus according to the invention will be explained. FIG. 1 is a diagram for explaining an internal structure of the image forming apparatus. This image forming apparatus 1 includes a color scanner unit 4 as an image scanning unit, a printer unit 6, an auto document feeder (hereinafter abbreviated as ADF) 7, and an operation panel 80.

The scanner unit 4 has the ADF 7 thereon and includes an original placing stand 8 that is disposed to be opposed to the ADF 7 in a closed state and formed by transparent glass on which an original is set. Below the original placing stand 8, an exposure lamp 25 that illuminates the original placed on the original placing stand 8 and a first mirror 26 that condenses light from the exposure lamp 25 on the original and bends reflected light from the original, for example, in a left direction with respect to the drawing are fixed to a first carriage 27.

The first carriage 27 is arranged to be movable parallel to the original placing stand 8 and reciprocatingly moved below the original placing stand 8 by a not-shown scanning motor via a not-shown toothed belt and the like.

Further, below the original placing stand 8, a second carriage 28 movable parallel to the original placing stand 8 is disposed. Second and third mirrors 30 and 31 that deflect reflected light from the original, which is deflected by the first mirror 26, in order are attached to the second carriage 28 at a right angle to each other. The second carriage 28 is driven to follow the first carriage 27 by the toothed belt and the like that drive the first carriage 27 and is moved at speed half of that of the first carriage 27 in parallel to the original placing stand 8.

Moreover, below the original placing stand 8, a focusing lens 32 that focuses reflected light from a third mirror 31 on the second carriage 28 and a CCD (a photoelectric conversion element) 34 that receives and photoelectrically converts the reflected light focused by the focusing lens are disposed. The focusing lens 32 is disposed to be movable via a driving mechanism in a plane including an optical axis of the light deflected by the third mirror 31 and focuses the reflected light at a predetermined magnification by moving itself. The CCD 34 photoelectrically converts the reflected light made incident thereon and outputs an electric signal corresponding to the original read.

On the other hand, the printer unit 6 includes a laser exposure device 40 that acts as latent image forming means. The laser exposure device 40 includes a semiconductor laser as a light source, a polygon mirror as a scanning member that continuously deflects a laser beam emitted from the semiconductor laser, a polygon motor as a scanning motor that drives to rotate the polygon mirror at a predetermined number of revolutions, and an optical system that deflects the laser beam from the polygon mirror and leads the laser beam to a photoconductive drum 44 described later.

The printer unit 6 has a rotatable photoconductive drum 44 as an image bearing member disposed in substantially the center of an apparatus main body. The peripheral surface of the photoconductive drum 44 is exposed by the laser beam from the laser exposure device 40 and a desired electrostatic latent image is formed thereon. Around the photoconductive drum 44, an electrifying charger 45 that charges the drum peripheral surface to a predetermined charge, a developing device unit 46 that supplies a toner as a developing agent to the electrostatic latent image formed on the peripheral surface of the photoconductive drum 44 and develops the electrostatic latent image at a desired image density, and a transfer charger 48 that transfers a toner image formed on the photoconductive drum 44 onto a sheet are arranged.

In a lower part in the apparatus main body, sheet feeding cassettes 52 and 54, which can be drawn out from the apparatus main body, respectively, are disposed in a state in which the sheet feeding cassette 52 is provided on the sheet feeding cassette 54.

A registration roller pair 65 is provided on an upstream side of the photoconductive drum 44. The registration roller pair 65 corrects inclination of a copy sheet taken out, aligns the leading end of the toner image on the photoconductive drum 44 and the leading end of the copy sheet, and feeds the copy sheet to a transfer belt unit 49 at the same speed as moving speed of the peripheral surface of the photoconductive drum 44.

In a front upper part of the apparatus main body, an operation panel 80 for inputting various copying conditions, a copy start signal for starting a copying operation, and the like is provided. As shown in, for example, FIG. 1, the operation panel 80 includes a print key 82, a panel CPU 83, and a liquid crystal display unit 84. The print key 82 instructs start of copying. The liquid crystal display unit 84 displays the number of originals and the number of copies and performs display of a copying magnification and edition and various kinds of operation guidance. A touch panel is provided in this liquid crystal display unit 84.

(Electrical Structure)

Figure 2:
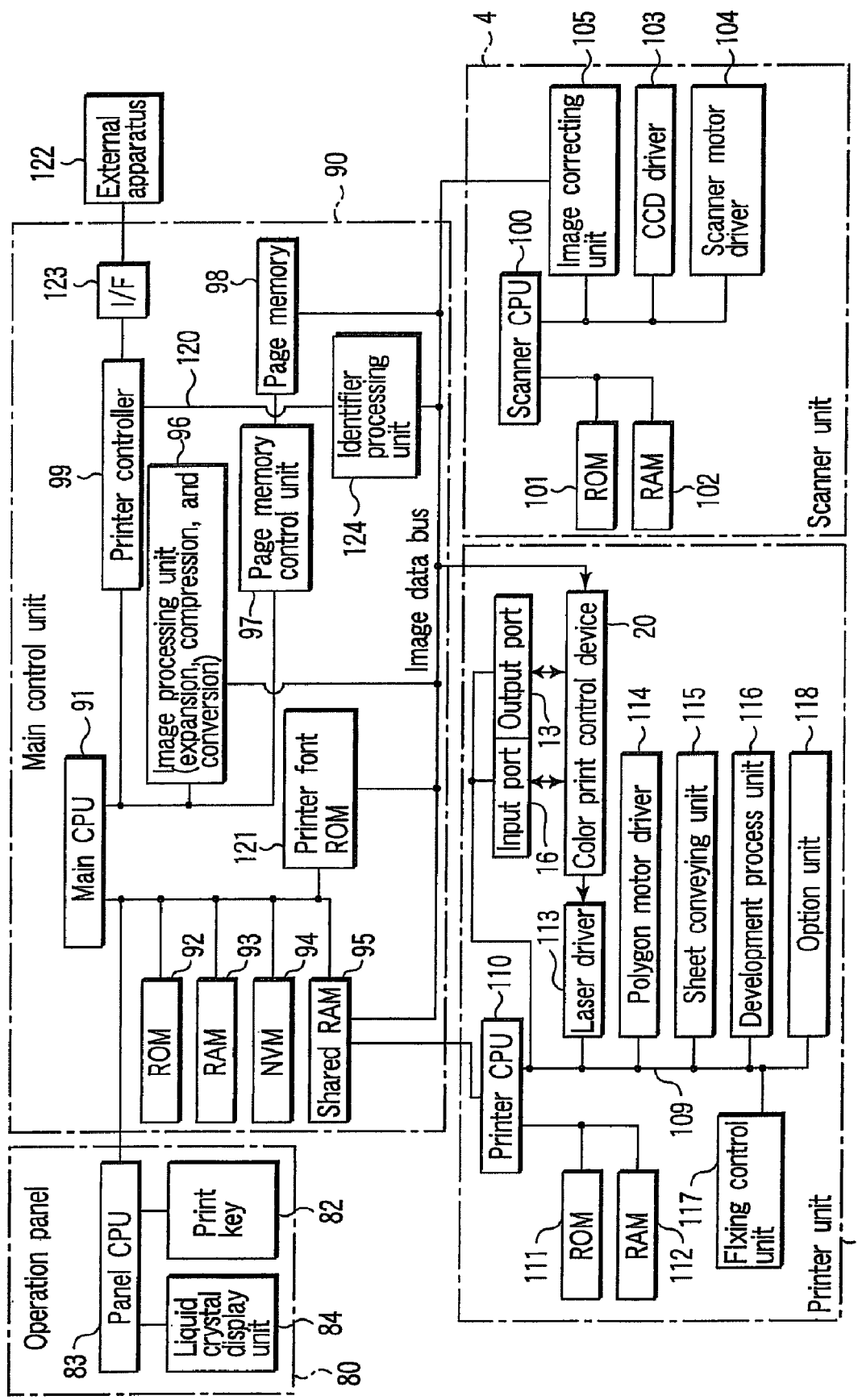
FIG. 2 is a block diagram for explaining an example of an electrical structure of the image forming apparatus according to the invention.

In a block diagram shown in FIG. 2, the image forming apparatus according to the invention includes a control unit constituted by three CPUs, namely, a main CPU (central processing unit) 91 in a main control unit 90, a scanner CPU 100 of the color scanner unit 4, and a printer CPU 110 of the color printer unit 6. The main CPU 91 performs serial communication with the printer CPU 110 and issues an operation instruction and the printer CPU 110 returns a status. The main CPU 91 performs serial communication with the scanner CPU 100 and issues an operation instruction and the scanner CPU 100 returns a status to the main CPU 91.

The operation panel 80 is connected to the main CPU 91. The main control unit 90 includes the main CPU 91, a ROM 92, a RAM 93, an NVM 94, an image processing unit 96 that performs expansion, compression, and conversion processing, a page memory control unit 97, a page memory 98, and a printer controller 99.

The main CPU 91 controls the entire main control unit 90. The ROM 92 has a control program stored therein. The RAM 93 temporarily stores data.

The NVM (nonvolatile random access memory: nonvolatile RAM) 94 is a nonvolatile memory backed up by a battery (not shown). The NVM 94 holds data thereon when a power supply is turned off.

The page memory control unit 97 stores image data in the page memory 98 and reads out image data from the page memory 98. The page memory 98 has an area enough for storing image data for plural pages. The page memory 98 is formed to be capable of storing, page by page, data obtained by compressing image data from the scanner unit 4. Font data corresponding to print data is stored in a printer font ROM 121.

The printer controller 99 includes the printer font ROM 121. The printer controller 99 expands print data from an external apparatus 200 such as a personal computer into image data using font data stored in the printer font ROM 121 at resolution corresponding to data indicating resolution given to the print data via an input port 16. An external interface 123 performs communication of various signals with the external apparatus 200. Image information and the like are acquired by a FAX unit 85 as a facsimile and stored by the page memory 98 and the like.

The scanner unit 4 includes the scanner CPU 100 that controls the entire scanner unit 4, a ROM 101 having a control program and the like stored therein, a RAM 102 for data storage, a CCD driver 103 that drives the CCD sensor 34, a scanner motor driver 104 that controls rotation of a motor for moving the exposure lamp 25, the mirrors 26, 30, and 31, and the like, and an image correcting unit 105 including an A/D conversion circuit for converting an analog signal from the CCD sensor 34 into a digital signal, a shading correction circuit for correcting fluctuation in a threshold level with respect to an output signal from the CCD sensor 34 due to variation in the CCD sensor 34, a change in an ambient temperature, or the like, and a line memory for temporarily storing a digital signal subjected to shading correction from the shading correction circuit.

The printer unit 6 includes the printer CPU 110 that controls the entire printer unit 6, a ROM 111 having a control program and the like stored therein, a RAM 112 for data storage, a laser driver 113 that turns on and off light emission (exposure) by a semiconductor laser, a polygon motor driver (a motor control device) 114 that controls rotation of a polygon motor of a laser unit, a sheet conveying unit 115 that controls conveyance of a sheet by a conveying path, a development process unit 116 that performs charging, development, and transfer using the electrifying charger 45, the developing device unit 46, and the transfer charger 48, a fixing control unit 117 that controls a fixing device unit 60, an option unit 118, an output port 13, the input port 16, and a color print control device 20 according to the embodiment of the invention.

The image processing unit 96 that performs expansion, compression, and conversion processing and the page memory 98 are connected to transmit and receive image data. The image correcting unit 105 and the image processing unit 96 are connected to transmit and receive image data. Similarly, the image correcting unit 105 and the color print control device 20 are connected to transmit and receive image data. The printer controller 99 and the image processing unit 96 are also connected to transmit and receive image data.

An identifier processing unit 124 that forms a new identifier (barcode) image on a recording medium such as a sheet on the basis of print command information from an external apparatus (PC) 122 or the like or an identifier (barcode) image on an original scanned by the scanner unit 4 is connected to an image data bus or the like and provided.

<Identifier Generation Processing According to the Embodiment of the Invention>

Identifier generation processing in the image forming apparatus according to the embodiment of the invention will be explained in detail using explanatory diagrams in FIGS. 3 to 11 and flowcharts in FIGS. 12 to 15.

Figure 3:
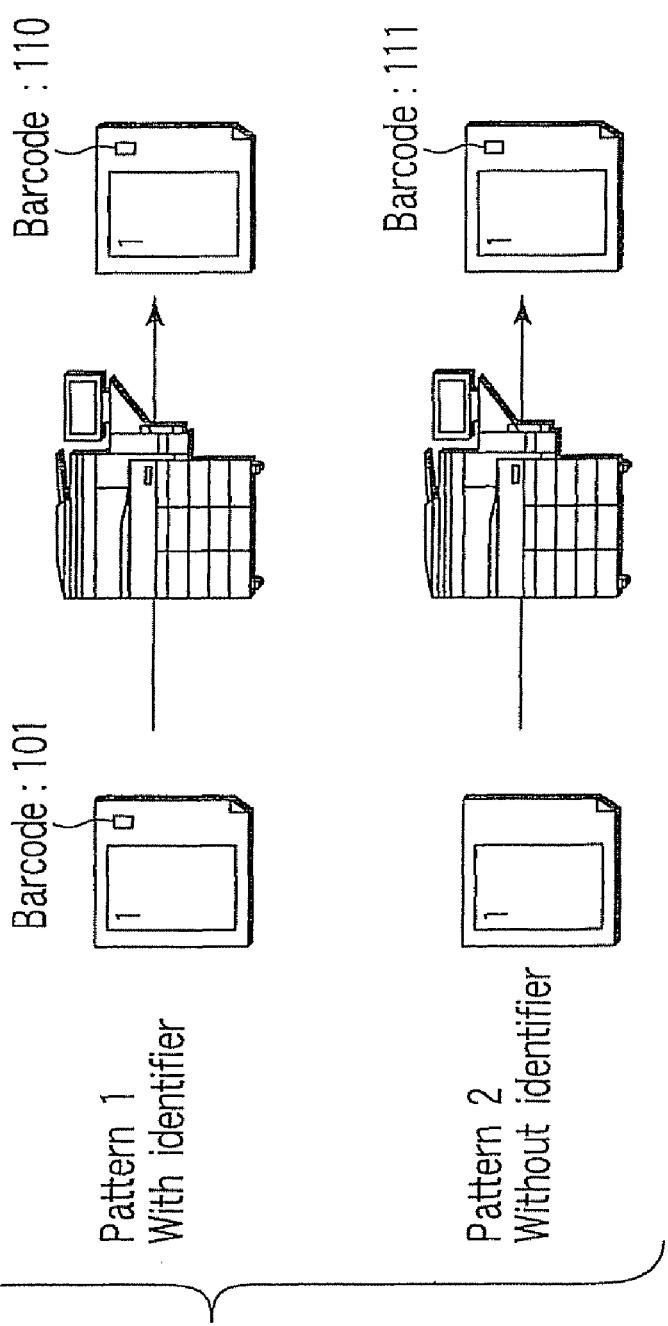
FIG. 3 is an explanatory diagram showing an example of N-in-1 copy processing employing a barcode in the image forming apparatus according to the invention.

As indicated by a pattern 1 in FIG. 3, the identifier generation processing according to the embodiment of the invention makes it possible to manage paper by reading identifier (barcode) information of the paper at the time of copying and generating and printing new identifier (barcode) to establish identity of the paper and trace the paper.

A pattern 2 in FIG. 3 means that it is possible to establish identity of paper by adding an identifier (a barcode) when an identifier is not added to a sheet at a copy source.

(Identifier Generation Processing Based on Print Information)

First, a case in which an image of an identifier is formed on a recording medium when a print instruction command is received from a PC or the like as the external apparatus 122 together with image information and image formation is performed will be explained. This is a case shown in FIG. 6. In a print instruction issued from the PC for printing of a document, a document name is 102.doc, a printing date and time is Jan. 3, 2006, a sheet is printed by simplex printing, a degree of confidentiality is "high", and printing of pages 1 to 8 in 1-in-1 is instructed.

The main CPU 91 and the identifier processing unit 123 of the image forming apparatus 1 perform normal printing of an image on the basis of the print instruction command, generate an identifier (barcode) of paper "with one side of a sheet to be printed set as one unit" in a defined area separate from an area of the printing, and print this identifier. In short, the main CPU 91 and the identifier processing unit 123 generate eight identifiers and print the identifiers.

Figure 7:
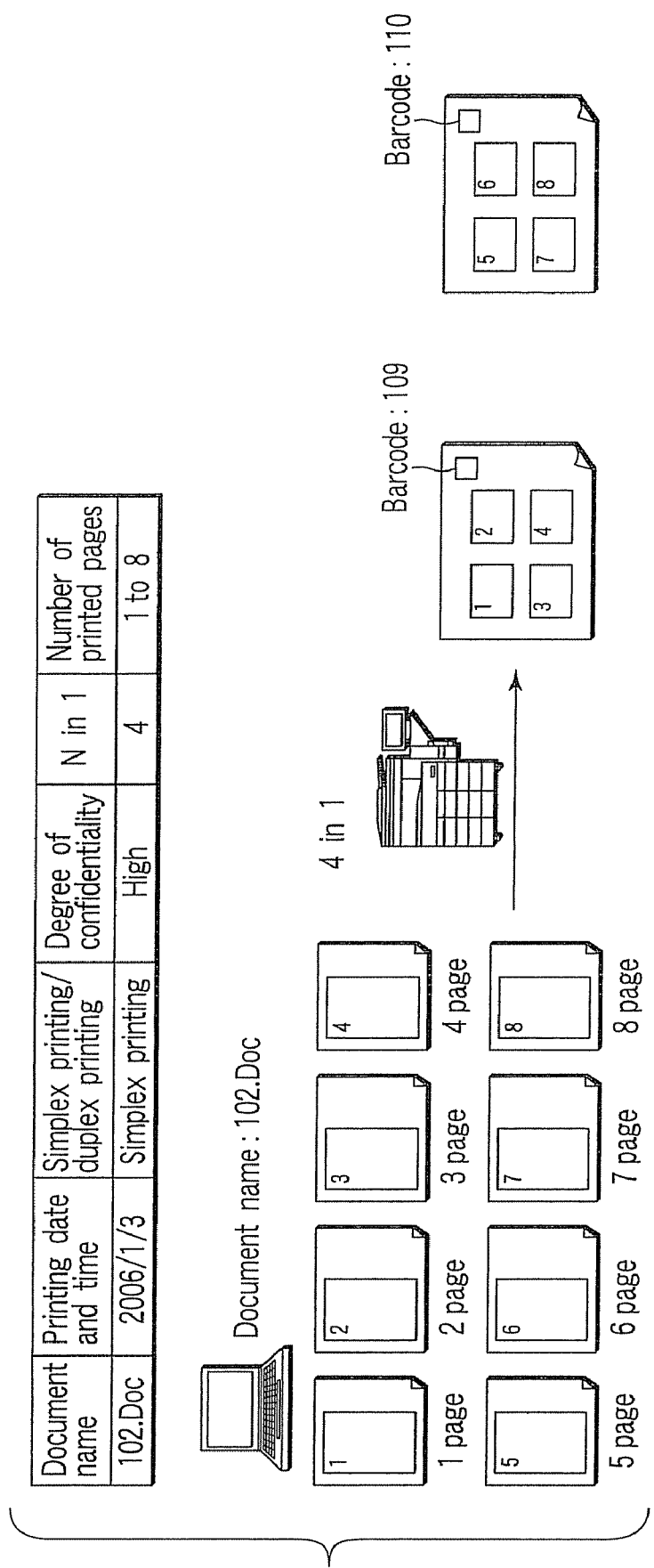
FIG. 7 is an explanatory diagram showing an example of N-in-j copy processing for copying to an image having a barcode based on a print command not having a barcode in the image forming apparatus according to the invention.

FIG. 7 also shows an example of document print instruction information from the PC. In a print instruction issued from the PC for printing of a document, a document name is 102.doc, a printing date and time is Jan. 1, 2006, a sheet is printed by simplex printing, a degree of confidentiality is "high", and printing of pages 1 to 8 in 4-in-1 is instructed.

Since copy processing is 4-in-1, the main CPU 91 and the identifier processing unit 123 of the image forming apparatus 1 generate two identifiers (109 and 110) as shown in FIG. 7 and print the identifiers as barcodes.

Figure 10:
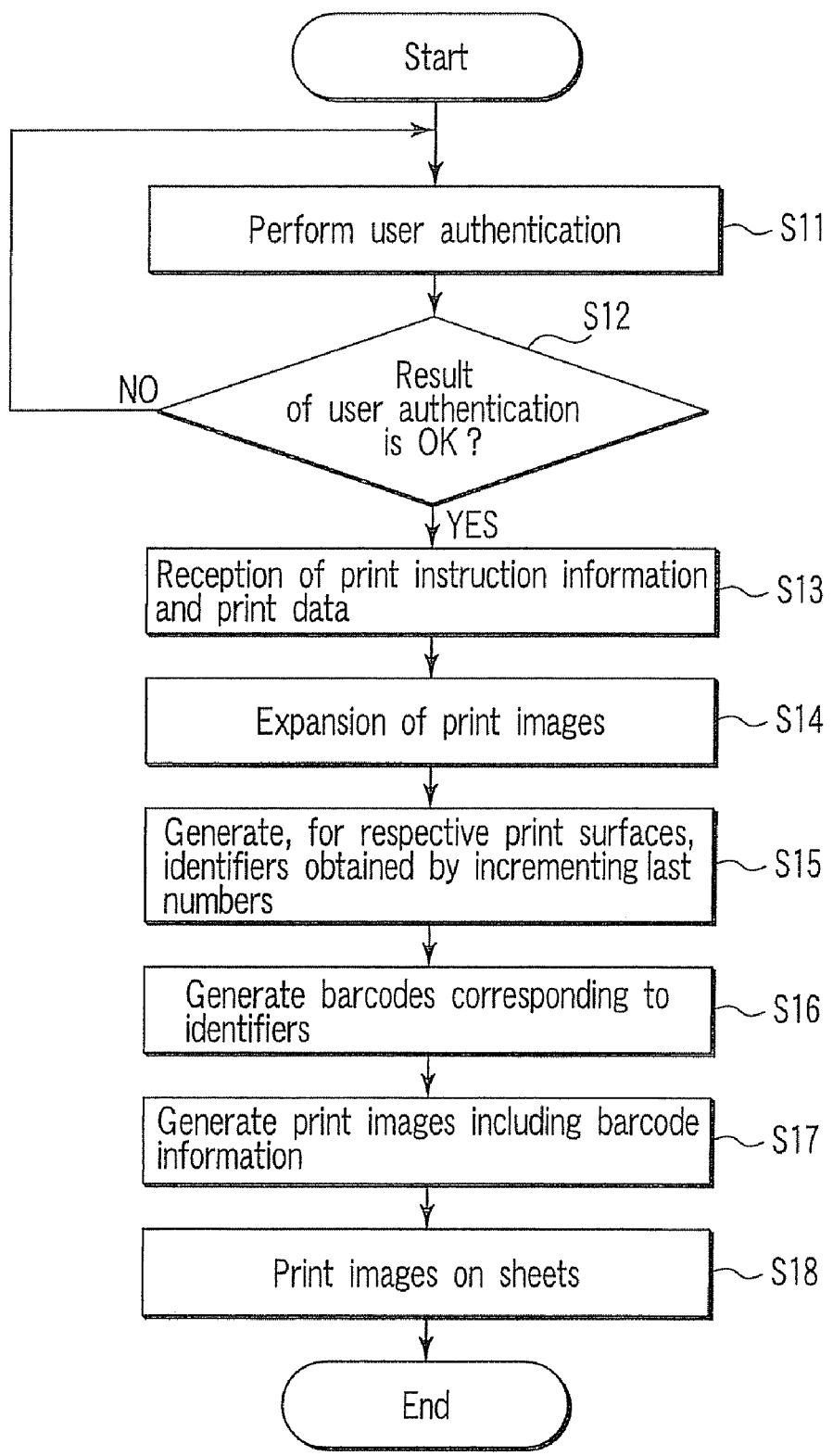
FIG. 10 is a flowchart showing an example of copy processing for copying to an image having a barcode based on a print command in the image forming apparatus according to the invention.

A specific procedure of the identifier generation processing in this case is shown in a flowchart in FIG. 10. First, as an example, at a point when use of the image forming apparatus 1 is started, the main CPU 91 and the identifier processing unit 123 of the image forming apparatus 1 perform user authentication from the print key 82 or the like (step S11) and determine whether a result of the user authentication is OK (step S12).

When the result of the user authentication is OK, the main CPU 91 and the identifier processing unit 123 receive image information as print data including a print instruction from a PC or the like of the external apparatus 122 (step S13). The main CPU 91 and the identifier processing unit 123 expand print images based on the image information as the print data (step S14).

The main CPU 91 and the identifier processing unit 123 generate incremented identifier numbers not overlapping one another for respective actual print surfaces (step S15) and generate barcodes on the basis of the identifier numbers (step S16). The main CPU 91 and the identifier processing unit 123 generate print images including barcode information (step S17). The main CPU 91 and the identifier processing unit 123 start printing of the print images generated (step S18).

Here, it is assumed that the identifiers of paper with a print surface set as one unit are managed by serial numbers and there are no overlapping numbers. When a plurality of the image forming apparatuses 1 are present, it is suitable to prevent overlap by adding production numbers and serial numbers peculiar to the image forming apparatuses 1. It is suitable to prevent overlapping of numbers by collectively managing a mechanism for generating numbers in a server rather than in the image forming apparatus 1.

When the numbers are printed, the image forming apparatus 1 converts the numbers into machine-readable formats (barcodes) and prints the numbers.

As an instruction for print setting, an instruction from an application or a printer driver at the time of printing is issued.

The image forming apparatus 1 performs expansion of an image on a sheet on the basis of an instruction from the printer driver and generates identification numbers with one side of the sheet to be printed set as one unit. The image forming apparatus 1 stores job information of the printing, for example, as shown in FIG. 8. The job information in FIG. 8 may be stored in the image forming apparatus 1 or it is also suitable to store the job information in an external server or the like.

In this way, it is possible to perform printing with barcodes (identifiers) by performing printing in specific areas different from normal printing areas as formats (barcodes) that prevent generation and overlapping of identifier numbers and are machine readable.

Another Embodiment

Figure 11:
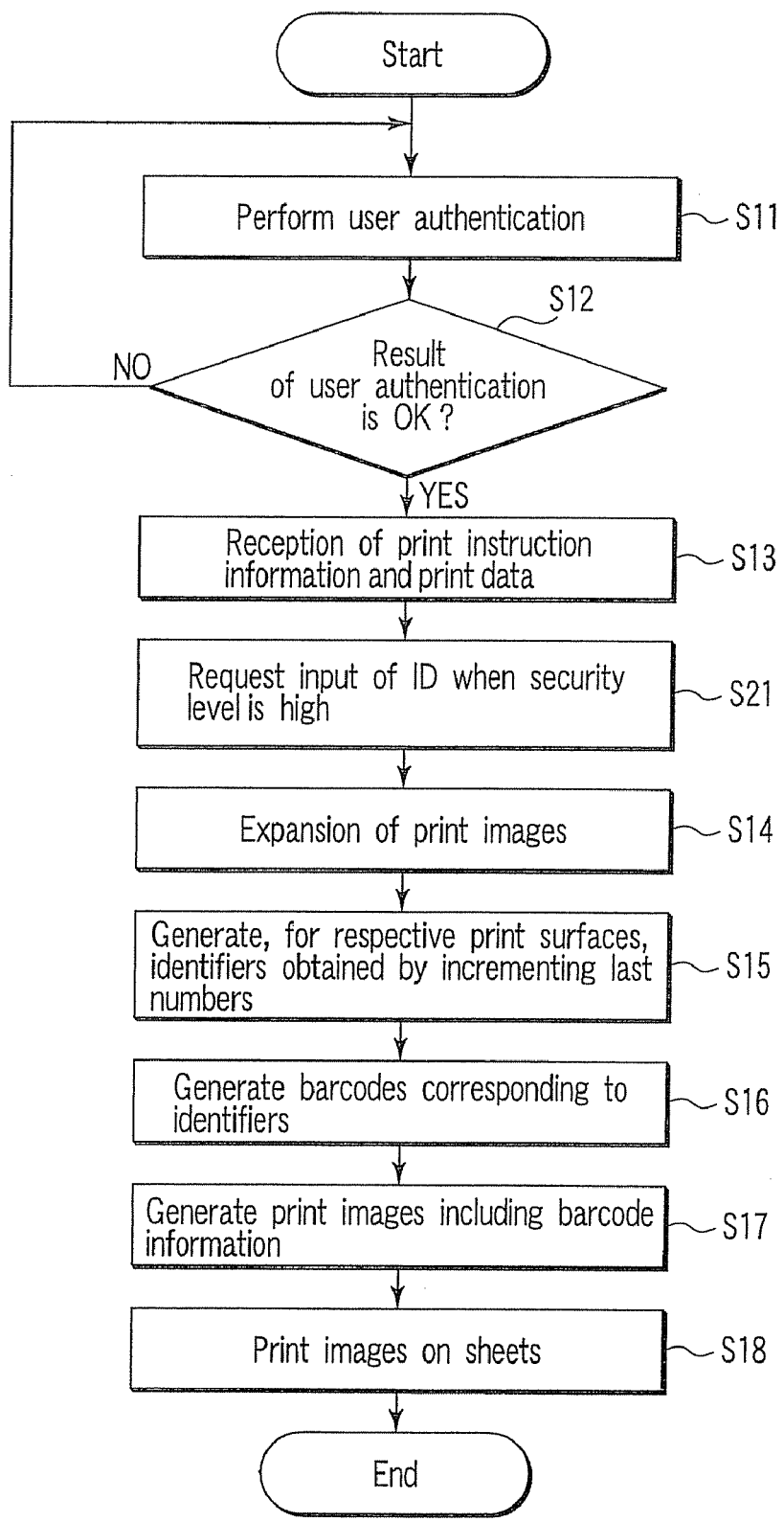
FIG. 11 is a flowchart showing another example of the copy processing for copying to an image having a barcode based on a print command in the image forming apparatus according to the invention.

As indicated by the flowchart in FIG. 11, when "a degree of confidentiality" included in a print instruction command is at a level higher than a normal level such as "high", the main CPU 91 and the identifier processing unit 123 of the image forming apparatus 1 request input of an ID of an operator from the print key 82 or the like of the operation panel 80 again (step S21). Only when the ID is proper, the main CPU 91 and the identifier processing unit 123 execute the processing in step S14 and the subsequent steps. This makes it possible to realize high security.

Figure 12:
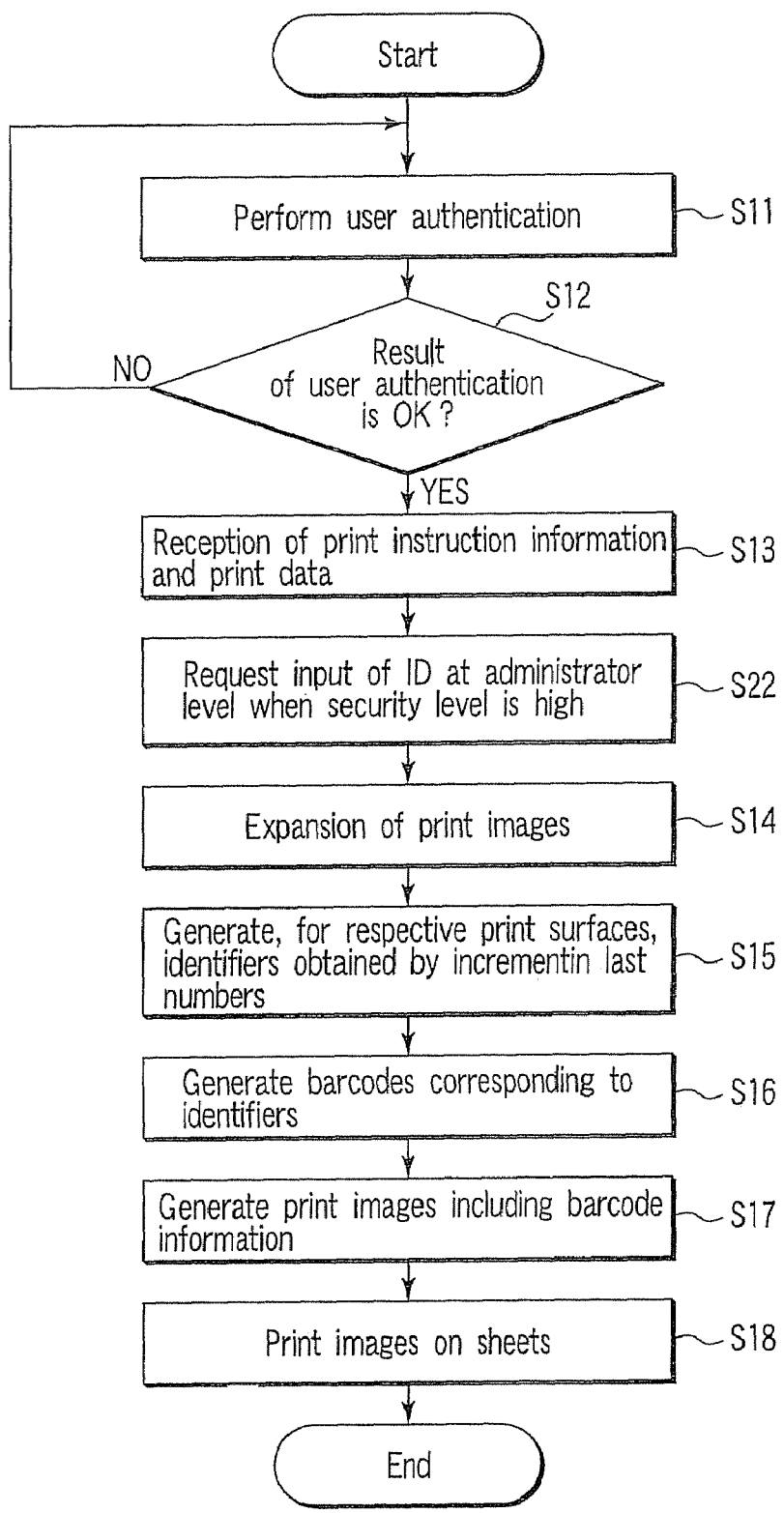
FIG. 12 is a flowchart showing another example of the copy processing for copying to an image having a barcode based on a print command in the image forming apparatus according to the invention.

Moreover, as indicated by the flowchart in FIG. 12, when "a degree of confidentiality" included in a print instruction command is at a level higher than a normal level such as "high", the main CPU 91 and the identifier processing unit 123 of the image forming apparatus 1 request input of an ID at an administrator level from the print key 82 or the like of the operation panel 80 again (step S22). It is suitable that the main CPU 91 and the identifier processing unit 123 determine whether the ID is proper and, only when the ID is proper, execute the processing in step S14 and the subsequent steps. This makes it possible to realize high security.

(Identifier Generation Processing Based on Original Scanning)

Figure 5:
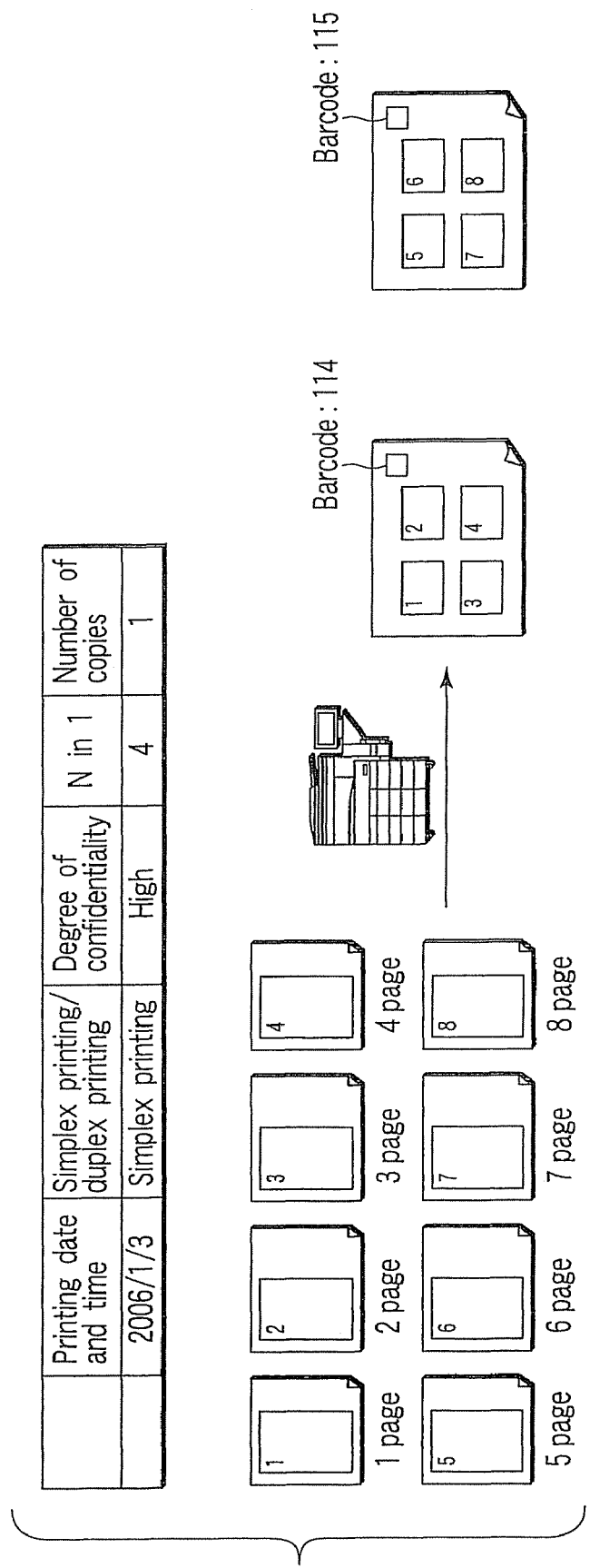
FIG. 5 is an explanatory diagram showing an example of N-in-1 copy processing for copying an original image not having a barcode to an image having a barcode in the image forming apparatus according to the invention.

First, as shown in FIG. 5, when one copy of eight originals is taken by simplex printing with a degree of confidentiality "high" in 4-in-1, two identifiers (114 and 115) are generated and printing is performed with barcodes attached to prints.

Figure 4:
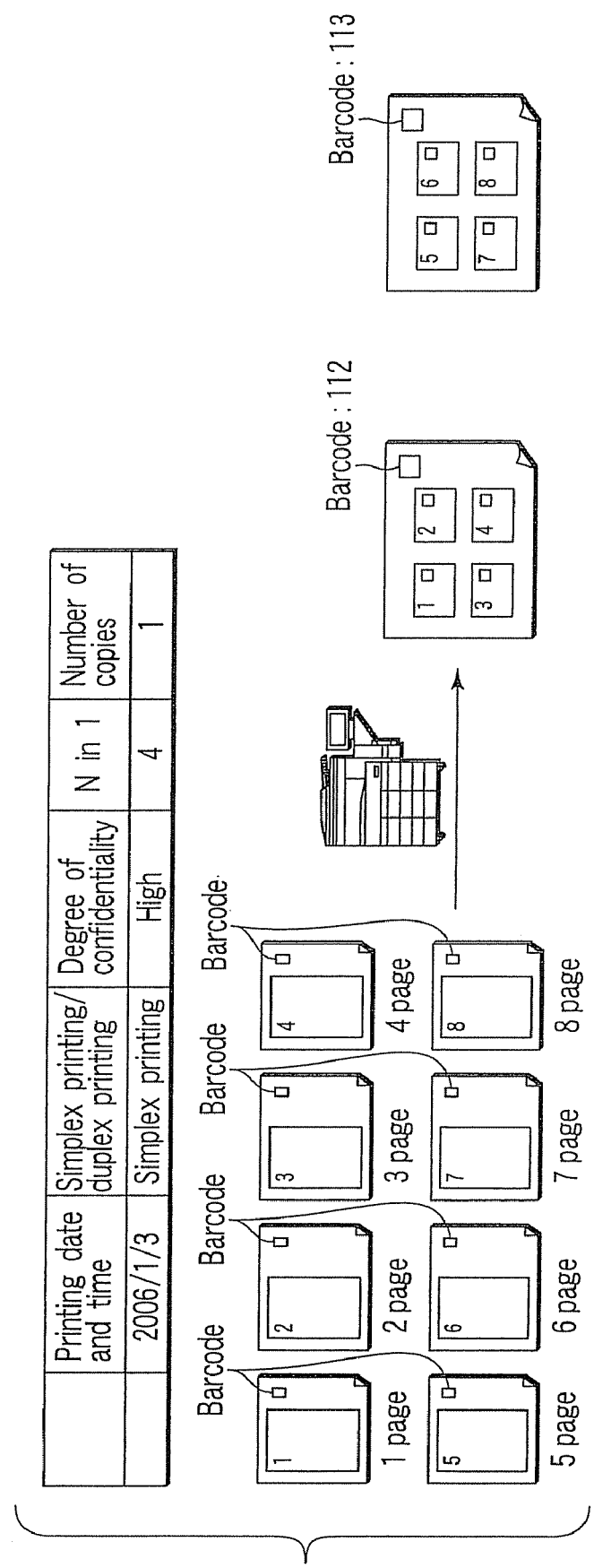
FIG. 4 is an explanatory diagram showing an example of N-in-1 copy processing for copying an original image having a barcode to an image having a barcode in the image forming apparatus according to the invention.

A case in which images are copied and new barcodes are formed on recording media by scanning originals provided with barcodes using a scanner or the like as shown in FIG. 4 will be explained. It is possible to trace, from information associated with numbers from barcodes, information on when and with what kind of designation a document was printed. It is also possible to easily recognize when a document with a high degree of confidentiality was printed.

The case described here is, as an example, a case in which one copy of eight sheets is taken by simplex printing with a degree of confidentiality "high" in 4-in-1. However, image formation performed in 1-in-1 is also included in this case.

A specific procedure of identifier generation processing in this case is shown in the flowchart in FIG. 3.

In the case of copying, as indicated by a pattern shown in FIG. 3, copying is performed on the basis of print command information such as the number of copies, simplex printing, a degree of confidentiality, N-in-1, and the number of prints.

Figure 13:
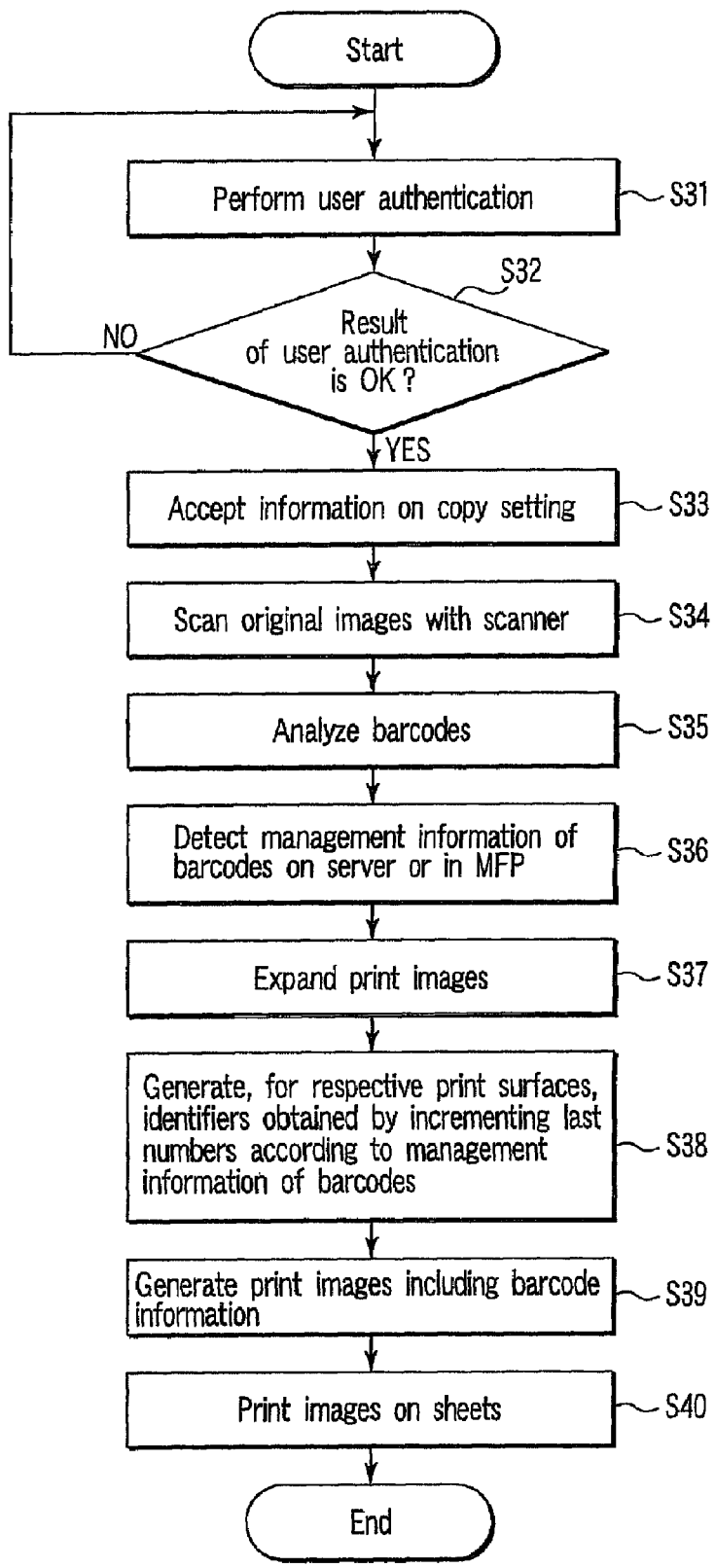
FIG. 13 is a flowchart showing an example of copy processing for copying an original having a barcode to an image having an incremented barcode in the image forming apparatus according to the invention.

A specific procedure of identifier generation processing in this case is shown in the flowchart in FIG. 13. The case described here is, as an example, a case in which one copy of eight sheets is taken by simplex printing with a degree of confidentiality "high" in 4-in-1 as in the case of FIG. 4. However, image formation performed in 1-in-1 is also included in this case.

First, as an example, at a point when use of the image forming apparatus 1 is started, the main CPU 91 and the identifier processing unit 123 of the image forming apparatus 1 perform user authentication from the print key 82 or the like (step S31) and determine whether a result of the user authentication is OK (step S32).

The main CPU 91 and the identifier processing unit 123 of the image forming apparatus 1 accept various kinds of setting information in performing normal copying processing stored in the ROM 92 or the like (step S33). The main CPU 91 and the identifier processing unit 123 scan original images with the scanner 4 or the like (step S34).

The main CPU 91 and the identifier processing unit 123 of the image forming apparatus 1 detect barcode images as identifier images in the original images scanned and analyze meaning of the barcode images (step S35). The main CPU 91 and the identifier processing unit 123 detect, on the server or the image forming apparatus 1, barcode information corresponding to barcodes meant by the barcode images detected (step S36).

The main CPU 91 and the identifier processing unit 123 of the image forming apparatus 1 expand print images, which should be printed, on the basis of the original images scanned by the scanner 4 or the like (step S37).

After expanding the original images to the print images, the main CPU 91 and the identifier processing unit 123 of the image forming apparatus 1 generate identifiers for respective print surfaces. In this case, overlapping of identifier numbers are prevented by incrementing identifier numbers of the last time. When number of copies limiting information such as "limitation on the number of copies" is included in management information of identifiers, the main CPU 91 and the identifier processing unit 123 update this information (step S38).

Figure 9:
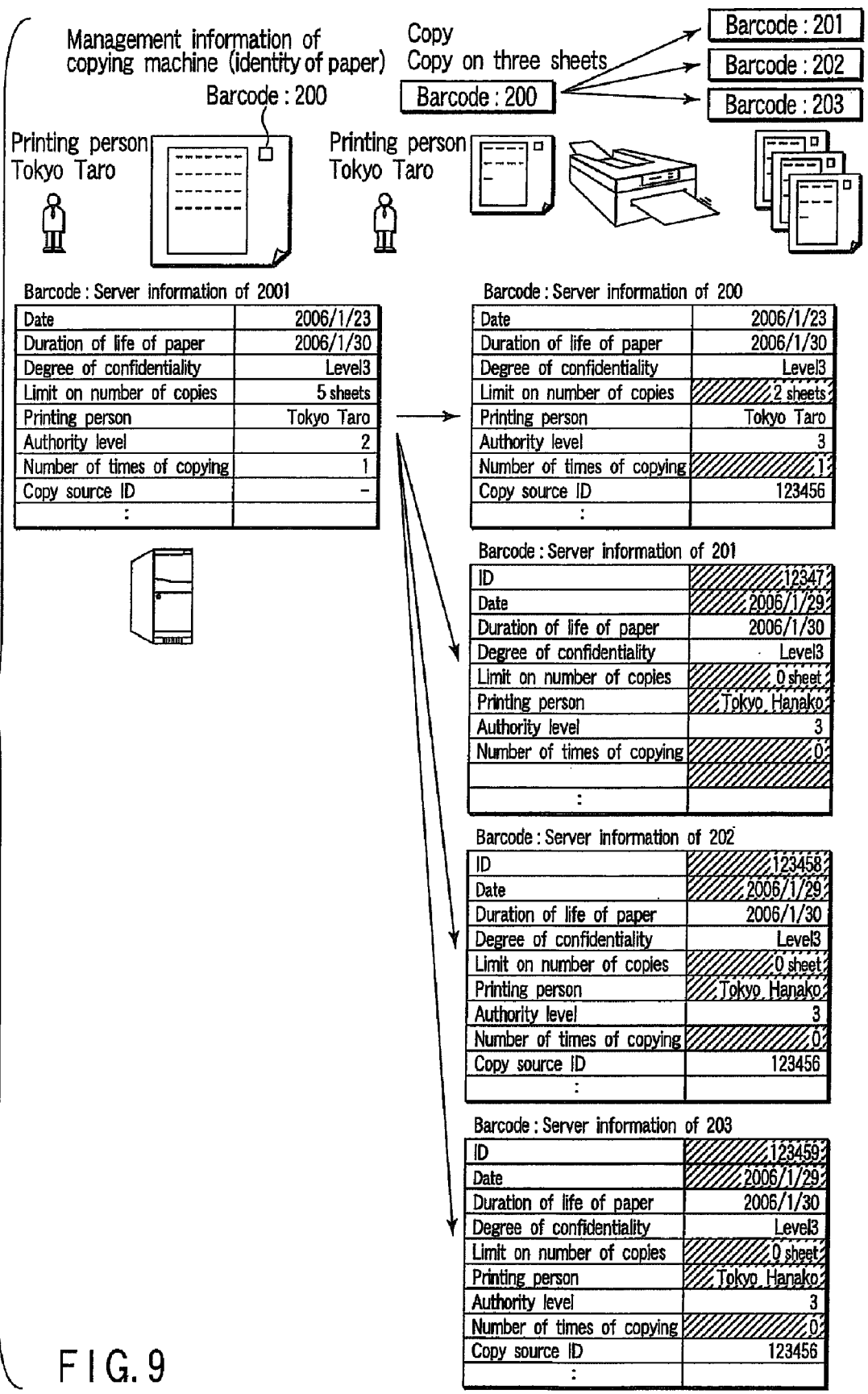
FIG. 9 is an explanatory diagram showing another example of the copy processing for copying an original having a barcode to an image having a bar code treated by the image forming apparatus according to the invention.

For example, in an example shown in FIG. 9, whereas the "limitation on the number of copies" in an original is five, the "limitation on the number of copies" on a recording medium is updated to "2" or "0". In the example shown in FIG. 9, when it is assumed that the limitation on the number of copies is five from information associated with the identifier 200 of the original, limitation on the number of originals after three copies are taken in 1-in-1 is 5−3=2 and is updated to information that the limitation on the number of originals is two. Limitation on the number of copies of the new identifiers 201, 202, and 203 copied is 0. After that, it is possible to set that copying based on this sheet is impossible.

In this way, eight identifiers shown on eight originals are scanned and two new identifiers are printed on two recording media (sheets) according to processing of 4-in-1. In this case, as shown in FIG. 8, identification numbers of pages 1 to 4 at a copy source are associated with an identification number 112 generated anew. Similarly, identification numbers of pages 5 to 8 of the copy source are associated with an identification number 113.

Moreover, if it is assumed that an authority level of the original shown in FIG. 9 is 2 and an authority level of a user who actually instructs copying is 3, when an authority 1, an authority 2, and an authority 3 are set as weak, medium, and strong, respectively, it is possible to set that a person with a strong authority is allowed to copy paper with a weak authority but the opposite is disallowed.

Since duration of life of the original shown in FIG. 9 is set as Jan. 30, 2006, it is also possible to set a restriction to disallow any authorized person to print paper that has passed this period.

It is possible to perform management for copying of paper by generating a new identifier, printing the identifier, and storing contents of the identifier even at the time of copying in this way.

In this way, print images of identifiers (barcodes), information of which is updated, are generated (step S39) and images of the identifiers (barcodes) are printed on recording media (recording sheets) together with the original images that should be printed (step S40).

Another Embodiment

Figure 14:
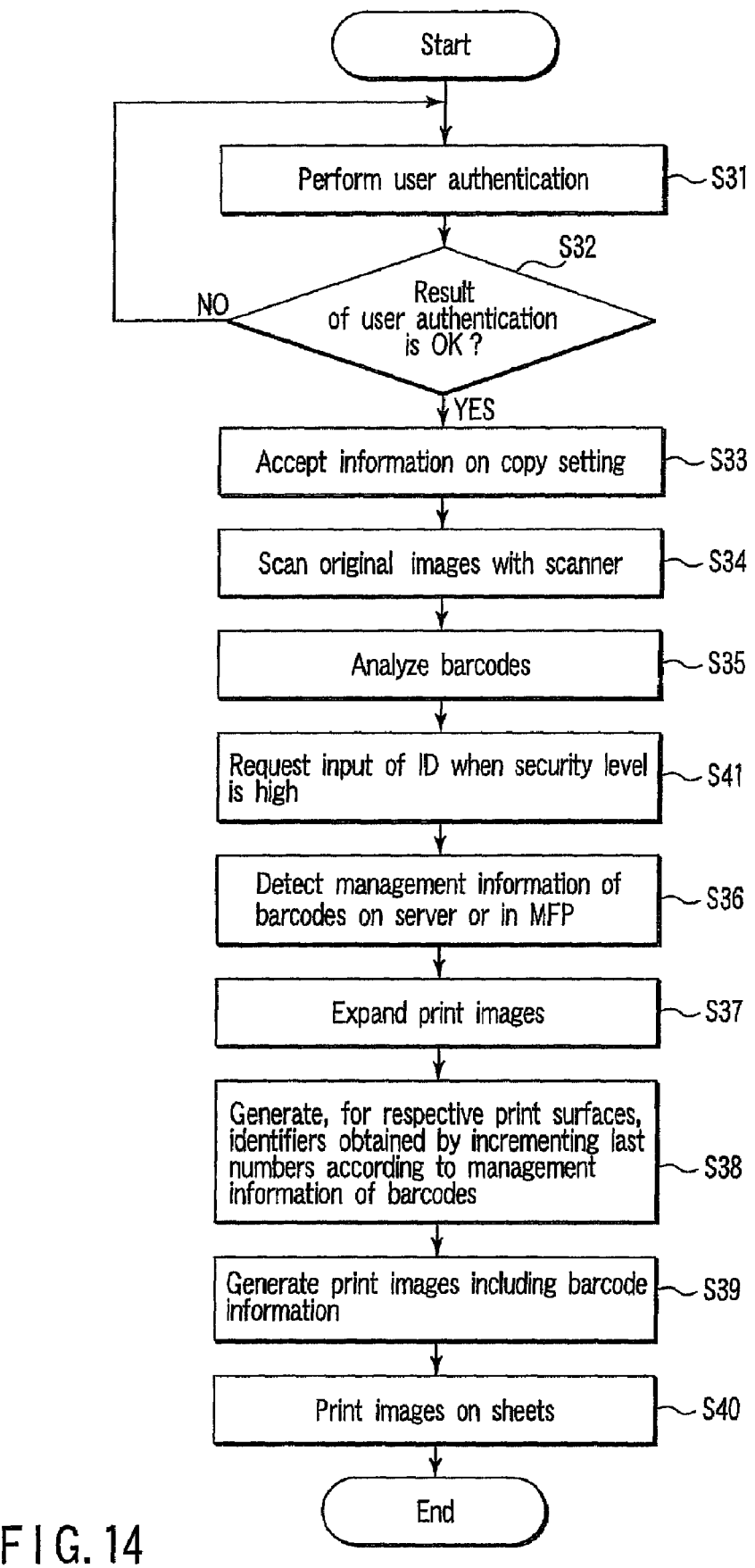
FIG. 14 is a flowchart showing another example of the copy processing for copying an original having a barcode to an image having an incremented barcode in the image forming apparatus according to the invention.

As indicated by the flowchart in FIG. 14, when "a degree of confidentiality" included in a print instruction command is at a level higher than a normal level such as "high", the main CPU 91 and the identifier processing unit 123 of the image forming apparatus 1 request input of an ID of an operator from the print key 82 or the like of the operation panel 80 again (step S41). Only when the ID is proper, the main CPU 91 and the identifier processing unit 123 execute the processing in step S36 and the subsequent steps. This makes it possible to realize high security.

Figure 15:
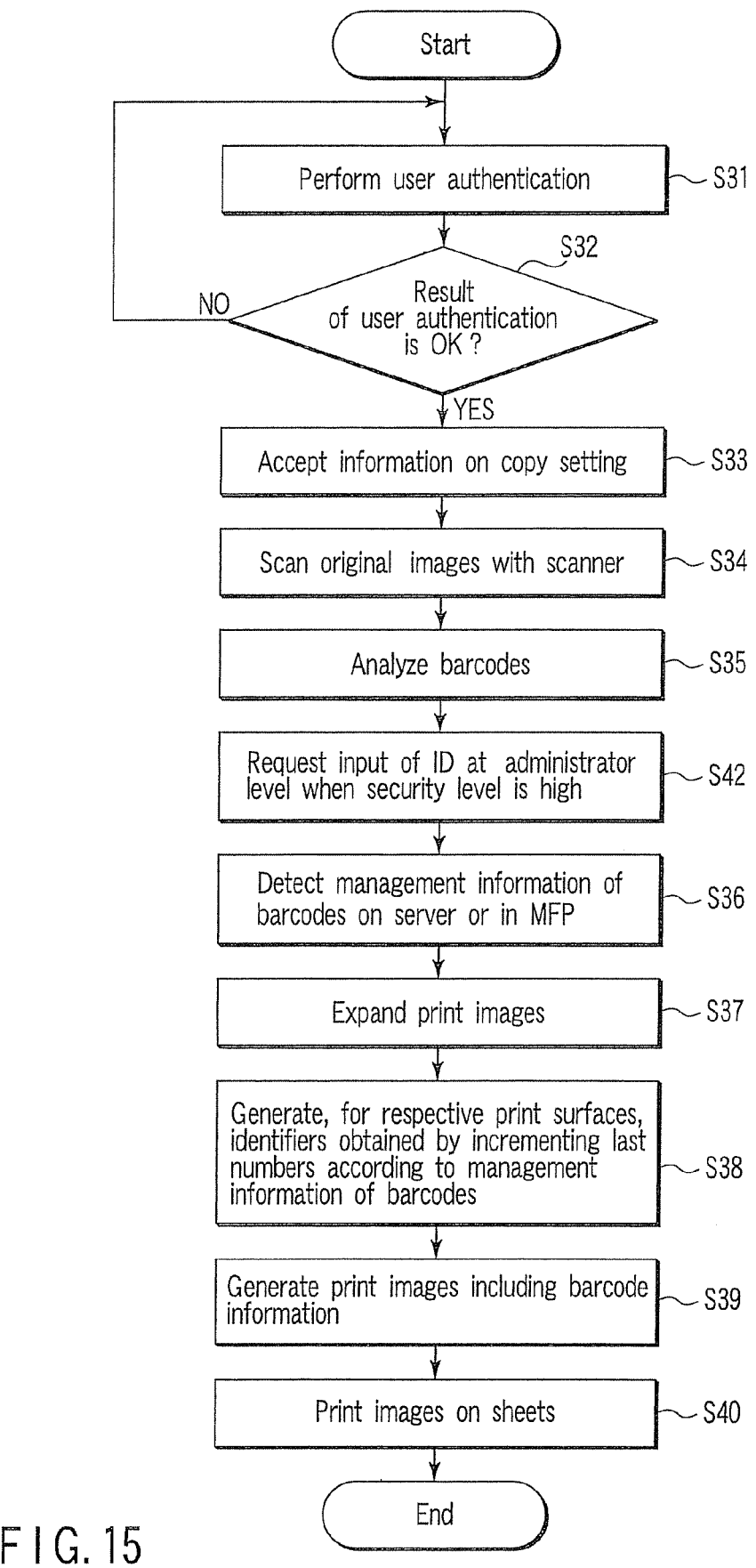
FIG. 15 is a flowchart showing another example of the copy processing for copying an original having a barcode to an image having an incremented barcode in the image forming apparatus according to the invention.

Moreover, as indicated by the flowchart in FIG. 15, when "a degree of confidentiality" included in a print instruction command is at a level higher than a normal level such as "high", the main CPU 91 and the identifier processing unit 123 of the image forming apparatus 1 request input of an ID at an administrator level from the print key 82 or the like of the operation panel 80 again (step S42). It is suitable that the main CPU 91 and the identifier processing unit 123 determine whether the ID is proper and, only when the ID is proper, execute the processing in step S36 and the subsequent steps. This makes it possible to realize high security.

As explained above in detail, according to the identifier formation processing of the image forming apparatus according to the embodiment of the invention, it is possible to manage all pieces of copy paper by reading identification information of paper printed in a possible format at the time of copying and automatically printing the new identification information in a readable format.

For example, it is possible to trace when and by whom a confidential document was issued and copied. This makes it possible to realize security of physical paper and protect the confidential document to make it impossible to copy the confidential document.

According to the various embodiments described above, those skilled in the art can realize the invention. However, various modifications of these embodiments will readily occur to those skilled in the art. It is possible to apply the embodiments to various embodiments without any inventive ability. Therefore, the invention extends over a wide range not contradicting the disclosed principles and new characteristics and is not limited to the embodiments described above.

What is claimed is:

1. A printing system comprising: an image forming apparatus; and
a server configured to store management information relevant to an identifier to be printed at the image forming apparatus, wherein the image forming apparatus comprises:
an interface configured to receive print data from an external apparatus;
a scanner configured to scan an original;
an operation unit configured to input a required number of copies of the original to be made by the scanner;
a storing device configured to store the print data received at the interface, and image data of the original scanned by the scanner;
an identifier processing unit, configured to function in at least a first and second mode, wherein in the first mode when the print data from the storing device is output by the image forming apparatus, the identifier processing unit is configured to generate and print a first identifier on the original to be output and to transmit the first identifier to the server, and wherein in the second mode when an identifier image corresponding to the first identifier is detected from image data of the original scanned by the scanner, the identifier processing unit is configured to obtain information from the server on whether or not an image to which the first identifier is associated is allowed to be copied, and when copying is allowed, to generate and print a second identifier on a copy and transmit the second identifier to the server; and
an image forming unit, when the print data is output, configured to form image data of the print data and a first identifier image corresponding to the first identifier on the original, and when the scanned image data is output, is configured to form the image data and a second identifier image corresponding to the second identifier on the copy,
wherein, the server, when the print data is output, is configured to set information on the allowable number of copies of the original to be made, by association with the first identifier, and wherein the server, when an original including the first identifier is copied, is configured to determine whether or not copying is allowable based on information on the allowable number of copies and a required number of copies, and wherein the server prohibits the image forming apparatus from copying when copying is determined as disallowable, and upon determining copying as allowable and performing the copying, the server is configured to reduce the number allowable copies associated with the first identifier based on the required number of copies and to sets the printing of the second identifier to the copy sheet indicating copying of the copy sheet is disallowable.

2. A printing system according to claim 1, wherein the identifier processing unit generates the first identifier or the second identifier for respective print surfaces of the sheets.

3. A printing system according to claim 2, wherein the image forming unit prints the first identifier image or the second identifier image on a position which does not overlap with the image data printed on the sheet.

4. A printing system according to claim 3, wherein the first identifier image or the second identifier image is a barcode image.

5. A printing system according to claim 1, wherein the server updates the information on the allowable number of copies by subtracting the number of copies from the information on the allowable number of copies.

6. A printing system according to claim 1, wherein the server sets information on life duration by associating it with the first identifier and the second identifier, and prohibits copying in a case where the life duration expires.

7. An image forming apparatus comprising:
an interface configured to receive print data from an external apparatus;
a scanner configured to scan an original;
an operation unit configured to input a required number of copies of the original to be made by the scanner;
a storing device configured to store the print data received at the interface and image data of the original scanned by the scanner;
an identifier processing unit, configured to function in at least a first and second mode, wherein in the first mode when the print data from the storing device is output, the identifier processing unit is configured to generate and print a first identifier on a sheet to be output and to set information on the number of pages allowed to be copied by association with the first identifier, and wherein in the second mode when an identifier image corresponding to the first identifier is detected from image data of the original scanned by the scanner, the identifier processing unit is configured to determine whether or not copying is allowable based on information on the number of pages allowed to be copied to which the first identifier is associated, and when copying is allowed and performed, to reduce the number of copies allowed to be made associated with the first identifier and to print a second identifier to the copied sheet indicating copying is disallowable; and an image forming unit, when the print data is output, configured to form image data of the print data and a first identifier image corresponding to the first identifier on the sheet, and when the scanned image data is output, configured to form the image data and a second identifier image corresponding to the second identifier on the sheet;
wherein when the print data is output, a server configured to storage management information relevant to an identifier to be printed at the image forming apparatus, is configured to set information on the allowable number of copies of the original to be made, by association with the first identifier, and wherein the server, when an original including the first identifier is copied, is configured to determine whether or not copying is allowable based on information on the allowable number of copies and a required number of copies, and wherein the server prohibits the image forming apparatus from copying when copying is determined as disallowable, and upon determining copying as allowable and performing the copying, the server is configured to reduce the number allowable copies associated with the first identifier based on the required number of copies and to sets the printing of the second identifier to the copy sheet indicating copying of the copy sheet is disallowable.

8. An image forming apparatus according to claim 7, wherein the identifier processing unit generates the first identifier or the second identifier for respective print surfaces of the sheets.

9. An image forming apparatus according to claim 8, wherein the image forming unit prints the first identifier image or the second identifier image on a position which does not overlap with the image data printed on the sheet.

10. An image forming apparatus according to claim 9, wherein the first identifier image or the second identifier image is a barcode image.

11. An image forming apparatus according to claim 7, further comprising:
a control unit updates the information on the allowable number of copies by subtracting the number of copies from the information on the allowable number of copies.

12. An image forming apparatus according to claim 7, wherein the control unit sets information on life duration by associating it with the first identifier and the second identifier, and prohibits copying in a case where the life duration expires.

13. An image forming method comprising:
receiving print data from an external apparatus in an image forming apparatus;
generating a first identifier to be printed on a sheet to be output based on the print data,
and setting information on the number of copies allowed to be made by associating it with the first identifier;
printing image data of the print data and a first identifier image corresponding to the first identifier on the sheet;
scanning the sheet on which the first identifier image is printed;
when detecting an identifier image corresponding to the first identifier from image data of the original scanned by the scanner, determining whether or not copying is allowable based on information on the number of pages allowed to be copied to which the first identifier is associated;
when copying is determined as allowable and copying is performed, reducing the number of copies allowed to be made associated with the first identifier;
setting a second identifier indicating that copying of copies is disallowable;
when the scanned image data is detected, printing the image data and a second identifier image corresponding to the second identifier on the sheet and when the second identifier image is detected from the scanned image data, prohibiting image forming based on the scanned image data;
wherein, when the print data is output, a server is configured to set information on the allowable number of copies of the original to be made, by association with the first identifier, and wherein the server, when an original including the first identifier is copied, is configured to determine whether or not copying is allowable based on information on the allowable number of copies and a required number of copies, and wherein the server prohibits the image forming apparatus from copying when copying is determined as disallowable, and upon determining copying as allowable and performing the copying, the server is configured to reduce the number allowable copies associated with the first identifier based on the required number of copies and to sets the printing of the second identifier to the copy sheet indicating copying of the copy sheet is disallowable.

14. An image forming method according to claim 13, wherein the first identifier or the second identifier is printed on respective print surfaces of the sheets.

15. An image forming method according to claim 14, wherein the first identifier image or the second identifier image is printed on a position which does not overlap with the image data printed on the sheet.

16. An image forming method according to claim 15, wherein the first identifier image or the second identifier image is a barcode image.

17. An image forming method according to claim 13, wherein the information on the allowable number of copies is updated by being subtracted the number of copies.

18. An image forming method according to claim 13, wherein information on life duration is set by being associated with the first identifier and the second identifier, and, in the case where the life duration expires, copying is prohibited.

* * * * *